United States Patent
Lohit et al.

(10) Patent No.: US 12,511,549 B2
(45) Date of Patent: Dec. 30, 2025

(54) SYSTEM AND METHOD FOR CROSS-MODAL KNOWLEDGE TRANSFER WITHOUT TASK-RELEVANT SOURCE DATA

(71) Applicant: Mitsubishi Electric Research Laboratories, Inc., Cambridge, MA (US)

(72) Inventors: Suhas Lohit, Somerville, MA (US); Sk Miraj Ahmed, Riverside, CA (US); Kuan Chuan Peng, Charlestown, MA (US); Michael Jones, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 454 days.

(21) Appl. No.: 18/154,887

(22) Filed: Jan. 16, 2023

(65) Prior Publication Data

US 2024/0013062 A1 Jan. 11, 2024

Related U.S. Application Data

(60) Provisional application No. 63/367,974, filed on Jul. 8, 2022.

(51) Int. Cl.
*G06N 3/096* (2023.01)
*G06V 10/74* (2022.01)
(Continued)

(52) U.S. Cl.
CPC ........... *G06N 3/096* (2023.01); *G06V 10/761* (2022.01); *G06V 10/7715* (2022.01); *G06V 10/82* (2022.01)

(58) Field of Classification Search
CPC .. G06V 10/82; G06V 10/761; G06V 10/7715; G06N 3/096
See application file for complete search history.

(56) References Cited

U.S. PATENT DOCUMENTS 11,734,571 B2 * 8/2023 Choo ..................... G06N 3/045
706/15
2020/0357143 A1 11/2020 Chiu et al.

FOREIGN PATENT DOCUMENTS

WO 2020256732 12/2020

OTHER PUBLICATIONS

Zhen, et al. (Deep Multimodal Transfer Learning for Cross-Modal Retrieval). (Year: 2022).*

(Continued)

*Primary Examiner* — Daniel G Mariam
(74) *Attorney, Agent, or Firm* — Gene Vinokur (57) ABSTRACT

A cross-modality knowledge transfer system is provided for adapting one or more source model networks to one or more target model networks. The system is configured to perform steps of providing the TI paired datasets through the source feature encoders of the one or more source model networks, extracting TI source features and TI source moments from the TI paired data by the BN layers of the one or more source model networks, providing the TI paired datasets and the unlabeled TR datasets through the one or more target model networks to extract TI target features and TR target moments, training jointly all the feature encoders of the one or more target model networks by matching the extracted TI target features and TR target moments with the TI source features and TI source moments along with mixing weights, and forming a final target model network by combining the trained one or more target model networks.

20 Claims, 9 Drawing Sheets

(51) Int. Cl.
  *G06V 10/77* (2022.01)
  *G06V 10/82* (2022.01)

(56) References Cited

OTHER PUBLICATIONS

Gupta, Saurabh, Judy Hoffman, and Jitendra Malik. "Cross modal distillation for supervision transfer." In Proceedings of the IEEE conference on computer vision and pattern recognition, pp. 2827-2836. 2016.
Ahmed, Sk Miraj, Dripta S. Raychaudhuri, Sujoy Paul, Samet Oymak, and Amit K. Roy-Chowdhury. "Unsupervised multi-source domain adaptation without access to source data." In Proceedings of the IEEE/CVF Conference on Computer Vision and Pattern Recognition, pp. 10103-10112. 2021.
Liang, Jian, Dapeng Hu, and Jiashi Feng. "Do we really need to access the source data? source hypothesis transfer for unsupervised domain adaptation." In International Conference on Machine Learning, pp. 6028-6039. PMLR, 2020.
Peng, Kuan-Chuan, Ziyan Wu, and Jan Ernst. "Zero-shot deep domain adaptation." In Proceedings of the European Conference on Computer Vision (ECCV), pp. 764-781. 2018.

\* cited by examiner

FIG. 1

| Property | UDA+DT | MSDA | SFDA | MSFDA | CMKD | ZDDA | SOCKET |
|---|---|---|---|---|---|---|---|
| Multiple sources | x | ✓ | x | x | x | x | ✓ |
| No source data | x | x | ✓ | ✓ | x | x | ✓ |
| Unlabeled target data | ✓ | ✓ | x | x | x | x | ✓ |
| Different target modality | x | x | x | x | ✓ | ✓ | ✓ |
| Usage of Task-Irrelevant Data | x | x | x | x | x | ✓ | ✓ |

Algorithm 1: Algorithm to Solve Eq. (6)

Input: $n$ source models trained on modality $m_S$ $\{\mathcal{F}_{S_k}^{m_S}\}_{k=1}^n = \{g_k \circ f_k\}_{k=1}^n$, unlabeled target data $\{x_{T_i}^i\}_{i=1}^{n_T}$ from modality $m_T$, TI cross modal pairs $\{x_{T_j}^{m_S}, x_{T_j}^{m_T}\}_{j=1}^{n_{TI}}$, mixing weights $\{\zeta_k\}_{k=1}^n$, max number of epochs $E$, regularization parameters $\lambda_{TI}, \lambda_d$, number of batches $B$

Output: Optimal adapted feature encoders $\{f_k^*\}_{k=1}^n$, mixing weights $\{\zeta_k^*\}_{k=1}^n$

Initialization: Freeze final classification layers $\{g_k\}_{k=1}^n$, set $\zeta_k = \frac{1}{n}$ for all $k$ Calculate $\{\psi_j\}_{j=1}^B \forall i \in [1, 2, \ldots, n_T]$ using Eq. (1)

Retrieve $\mathbb{E}[\mu_l | \mathcal{X}_{S_j}]$ and $\mathbb{E}[\sigma_l^2 | \mathcal{X}_{S_j}]$ for all $j$ and $l$ as in Section 4.2

Knowledge Transfer Phase:

for $epoch = 1$ to $E$ do
    for $iteration = 1$ to $B$ do
        Sample a mini batch of target data and feed it through each of the source models
        Calculate loss terms in Eq. (2), (3), (4), and (5)
        Compute overall objective from Eq. (6)
        Update parameters in $\{f_k\}_{k=1}^n$ and $\{\zeta_k\}_{k=1}^n$ by optimizing (6)
        Make $\zeta$ non-negative by setting $\zeta_k := 1/(1 + e^{-\zeta_k})$
        Normalize $\zeta$ by setting $\zeta_k := \zeta_k / \sum_{i=1}^n \zeta_i$
    end
end Final target model $\mathcal{F}_T^{m_T} = \sum_{k=1}^n \zeta_k^* (g_k \circ f_k^*)$

FIG. 4

|  | SUN-RGBD | RGB-NIR Scene | DIML |
|---|---|---|---|
| Number of domains | 4 | 1 | 1 |
| Domain names | kv1,kv2,Realsense,Xtion | N/A | N/A |
| # of TR images for source training | 1264,1234,238,2512 | 204 | 527 |
| # of TR unlabeled images | 1264,1234,238,2512 | 204 | 527 |
| Number of TI paired images | 1709 | 153 | 1088 |
| Number of TR & TI classes | 17 & 28 | 6 & 3 | 6 & 12 |
| Modalities | RGB-D | RGB-NIR | RGB-D |

FIG. 5

| Target depth | Kinect v1 | | | | Kinect v2 | | | | Realsense | | | | Xtion | | | |
|---|---|---|---|---|---|---|---|---|---|---|---|---|---|---|---|---|
| Source RGB | Unadapted | SHOT | SOCKET | Unadapted | SHOT | SOCKET | Unadapted | SHOT | SOCKET | Unadapted | SHOT | SOCKET | Unadapted | SHOT | SOCKET | |
| Kinect v1 | 14.8 | 16.7 | 25.3 | 14.6 | 20.3 | 23.6 | 9.0 | 11.9 | 13.4 | 7.1 | 15.3 | 18.1 | | | | |
| Kinect v2 | 4.0 | 12.8 | 13.6 | 17.0 | 29.4 | 35.2 | 10.8 | 19.3 | 22.8 | 10.6 | 7.0 | 8.3 | | | | |
| Realsense | 2.0 | 7.9 | 20.3 | 7.1 | 18.4 | 23.5 | 14.7 | 27.4 | 30.0 | 5.1 | 9.5 | 11.8 | | | | |
| Xtion | 0.7 | 9.5 | 14.2 | 6.0 | 20.2 | 24.2 | 9.0 | 21.8 | 23.5 | 8.1 | 13.2 | 22.2 | | | | |
| Average | 5.4 | 11.7 | 18.4 | 11.2 | 22.1 | 26.6 | 10.9 | 20.1 | 22.4 | 7.7 | 11.3 | 15.1 | | | | |

FIG. 6

| Source RGB \ Target depth | Kinect v1 | | Kinect v2 | | Realsense | | Xtion | |
|---|---|---|---|---|---|---|---|---|
| | DECISION | SOCKET | DECISION | SOCKET | DECISION | SOCKET | DECISION | SOCKET |
| Kinect v1 + Kinect v2 | 17.9 | 19.5 | 34.2 | 36.6 | 18.8 | 19.8 | 14.6 | 18.0 |
| Kinect v1 + Realsense | 12.6 | 18.0 | 23.3 | 26.8 | 24.3 | 24.7 | 10.9 | 12.2 |
| Kinect v1 + Xtion | 11.7 | 23.9 | 29.6 | 35.7 | 20.3 | 21.1 | 16.7 | 20.0 |
| Kinect v2 + Realsense | 7.4 | 11.7 | 22.7 | 33.1 | 28.4 | 29.4 | 8.9 | 9.1 |
| Kinect v2 + Xtion | 14.8 | 16.2 | 27.0 | 31.0 | 25.0 | 25.0 | 11.6 | 18.3 |
| Realsense + Xtion | 8.3 | 10.7 | 23.1 | 25.2 | 30.1 | 31.5 | 9.5 | 10.8 |
| Average | 12.1 | 16.6 | 26.7 | 31.4 | 24.6 | 25.3 | 11.7 | 14.7 |

FIG. 7

| TI data | Unadapted | SHOT | SOCKET | SOCKET | SOCKET |
|---|---|---|---|---|---|
| | | | DIML RGB+D | SUN RGB-D | |
| RGB→Depth | N/A | N/A | | | |
| | 26.9 | 41.4 | 46.1 | 53.2 | |

FIG. 8

| Setting / Method | Unadapted SHOT | SHOT SOCKET |
|---|---|---|
| RGB → NIR | 84.8 | 86.7 | 90.2 |
| NIR → RGB | 65.2 | 92.2 | 92.7 |

FIG. 9

| Source | Cross-Modal | Cross-Domain |
|---|---|---|
| Kinect v1 | 16.7 | 24.5 |
| Kinect v2 | 29.4 | 39.6 |
| Realsense | 27.4 | 29.7 |
| Xtion | 13.2 | 43.1 |
| Average | 21.7 | 34.2 |

FIG. 10

| $\mathcal{L}_{ma}$ | $\mathcal{L}_d$ | $\mathcal{L}_{TI}$ | (a) accuracy (%) | (b) accuracy (%) |
|---|---|---|---|---|
| ✓ | | | 30.0 | 11.7 |
| ✓ | ✓ | | 31.6 (↑1.6) | 18.3 (↑6.6) |
| ✓ | | ✓ | 34.9 (↑4.9) | 22.6 (↑10.9) |
| ✓ | ✓ | ✓ | 36.3 (↑6.3) | 23.9 (↑12.2) |

FIG. 11

| Images per class | 60 | 40 | 20 | 0 |
|---|---|---|---|---|
| Accuracy (%) | 25.0 | 22.5 | 20.3 | 16.7 |

FIG. 12A

| $(\lambda_{TI}, \lambda_d)$ | 0.00 | 0.05 | 0.10 | 0.50 | 1.00 |
|---|---|---|---|---|---|
| Kinect v1 | 16.1 | 15.0 | 16.6 | 23.4 | 21.0 |
| Kinect v2 | 20.3 | 34.2 | 35.0 | 36.7 | 16.3 |

SYSTEM AND METHOD FOR CROSS-MODAL KNOWLEDGE TRANSFER WITHOUT TASK-RELEVANT SOURCE DATA

FIELD OF THE INVENTION

The present invention is related to system and method for Cross-Modal Knowledge Transfer Without Task-Relevant Source Data.

BACKGROUND OF THE INVENTION

Cross-modal knowledge distillation (CMKD) methods aim to learn a rich representation for a modality which does not have a large number of labeled data from a large labeled dataset of another modality. These methods have been used for a variety of practical computer vision tasks like action recognition, image recognition. Most of the works along this line are based on the assumption of having access to Task-Relevant paired data across modalities. A recent line of work relaxed this assumption in the context of domain generalization, where one does not have access to the Task-Relevant paired data on the target domain but has access to them for the source domain. For instance, these methods consider Uniform Database Access (UDA) across domains, where the target domain has unlabeled RGB–D pairs instead of a single modality. All of the above works either utilize the Task-Relevant paired data for cross modal knowledge transfer, or consider cross modal paired data as a domain. There are also works in zero-shot domain adaptation that utilize external task-irrelevant paired data but need access to the source data. To combat the storage or privacy issue regarding the source data, a new line of work named Hypothesis Transfer Learning (HTL) has emerged recently, where one has access only to the trained source model instead of the source data. In this context, people have explored adapting target domain data, which has limited labels or no labels at all in the presence of both single source—Source-Free Domain Adaptation (SFDA)—or multiple source models—Multiple Source-Free Domain Adaptation (MSFDA). These methods do not work well in a regime where the unlabeled target set is from a different modality than the source. There is a need a novel Cross-Modal Knowledge Transfer method that allows for different source and target modalities, and can perform effective knowledge transfer without access to the task-relevant data used to train the source models.

SUMMARY OF THE INVENTION

The present disclosure relates to systems and methods for System and Method for Cross-Modal Knowledge Transfer Without Task-Relevant Source Data.

Some embodiments of the present invention describe that Cost-effective depth and infrared sensors as alternatives to usual RGB sensors are now a reality, and their advantages over RGB in domains like autonomous navigation and remote sensing are clearly understood. As such, building computer vision and deep learning systems for depth and infrared data are crucial. However, large labeled datasets for these modalities are still lacking. In such cases, transferring knowledge from a neural network trained on a well-labeled large dataset in the source modality (RGB) to a neural network that works on a target modality (depth, infrared, etc.) is of great value. For reasons like memory and privacy, it may not be possible to access the source data, and the knowledge transfer needs to work with only the source models. We describe an effective solution, SOCKET: SOurce-free Cross-modal KnowledgE Transfer for this challenging task of transferring knowledge from one source modality to a different target modality without access to source data. The framework reduces the modality gap using paired task-irrelevant data, as well as by matching the mean and variance of the target features with the batch-norm statistics that are present in the source models. We show through extensive experiments that our method significantly outperforms (by up to 12% in some cases) existing source-free methods for classification tasks which do not account for the modality gap.

According to some embodiments of the present invention, a cross-modality knowledge transfer system is provided for adapting one or more source model networks to one or more target model networks. The cross-modality knowledge transfer system may include a memory configured to store task-irrelevant (TI) paired datasets, unlabeled task-relevant (TR) datasets, the one or more source model networks including batch normalization (BN) layers, feature encoders, convolutional neural network layers (CNN layers) and classifiers, the one or more target model networks including the BN layers, the feature encoders, the CNN layers and the classifiers, and a computer-implemented cross-modality knowledge transfer method having instructions; at least one processor configured to perform steps of the computer-implemented cross-modality knowledge transfer method according to the instructions, wherein the steps comprise: extracting TI source features and TR source moments from the one or more source model networks by passing the TI source paired datasets through the one or more source model networks, wherein the CNN layers and the classifiers of the one or more source model networks are frozen; extracting batch-wise TI target features and TR target moments from one or more target model networks by passing the TI paired datasets and the unlabeled TR datasets through the one or more target model networks, wherein the classifiers of the one or more target model networks are frozen; computing modality-agnostic functions based on the extracted TR target features of the one or more target model networks; training jointly the feature encoders of the one or more target model networks by minimizing the computed modality-agnostic losses; and generating a final target model network by combining the trained one or more target model networks.

Further, some embodiments of the present invention provide a computer-implemented cross-modality knowledge transfer method having instructions using at least one processor and at least one memory. In this case, the instructions include extracting TI source features and TR source moments from the one or more source model networks by passing the TI source paired datasets through the one or more source model networks, wherein the CNN layers and the classifiers of the one or more source model networks are frozen; extracting batch-wise TI target features and TR target moments from one or more target model networks by passing the TI paired datasets and the unlabeled TR datasets through the one or more target model networks, wherein the classifiers of the one or more target model networks are frozen; computing modality-agnostic losses based on the extracted TR target features of the one or more target model networks; training jointly the feature encoders of the one or more target model networks by minimizing the computed modality-agnostic losses; and generating a final target model network by combining the trained one or more target model networks.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Figure 1:
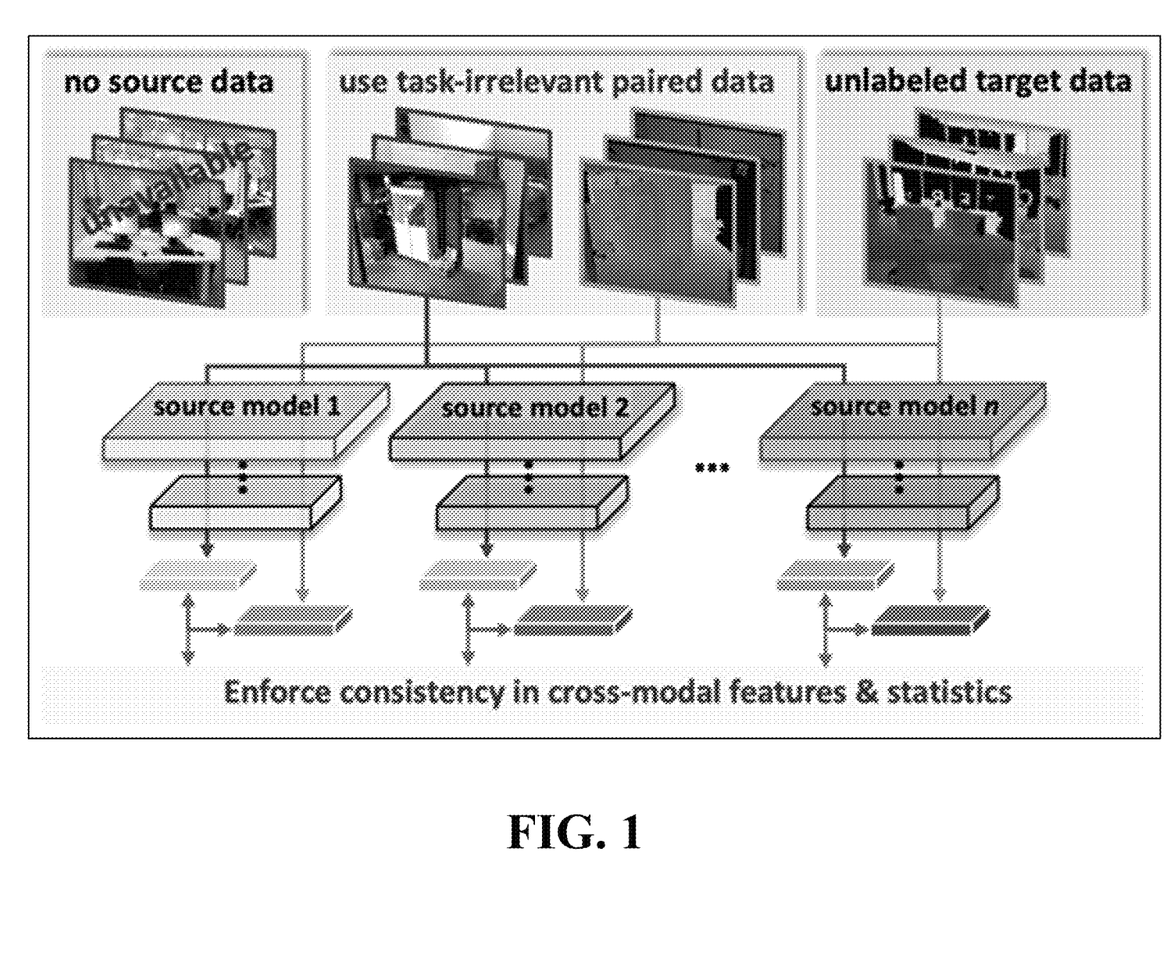
FIG. 1 shows a schematic illustrating SOCKET method, according to embodiments of the present invention.

FIG. 1 shows a schematic illustrating SOurce-free Crossmodal KnowledgE Transfer (SOCKET) method according to some embodiments of the present invention. We describe the problem of single/multi-source cross-modality knowledge transfer using no data used to train the source models. To effectively perform knowledge transfer, we minimize the modality gap by enforcing consistency of cross modal features on task-irrelevant paired data in feature space, and by matching the distributions of the unlabeled Task-Relevant features and the source features.

Figure 2:
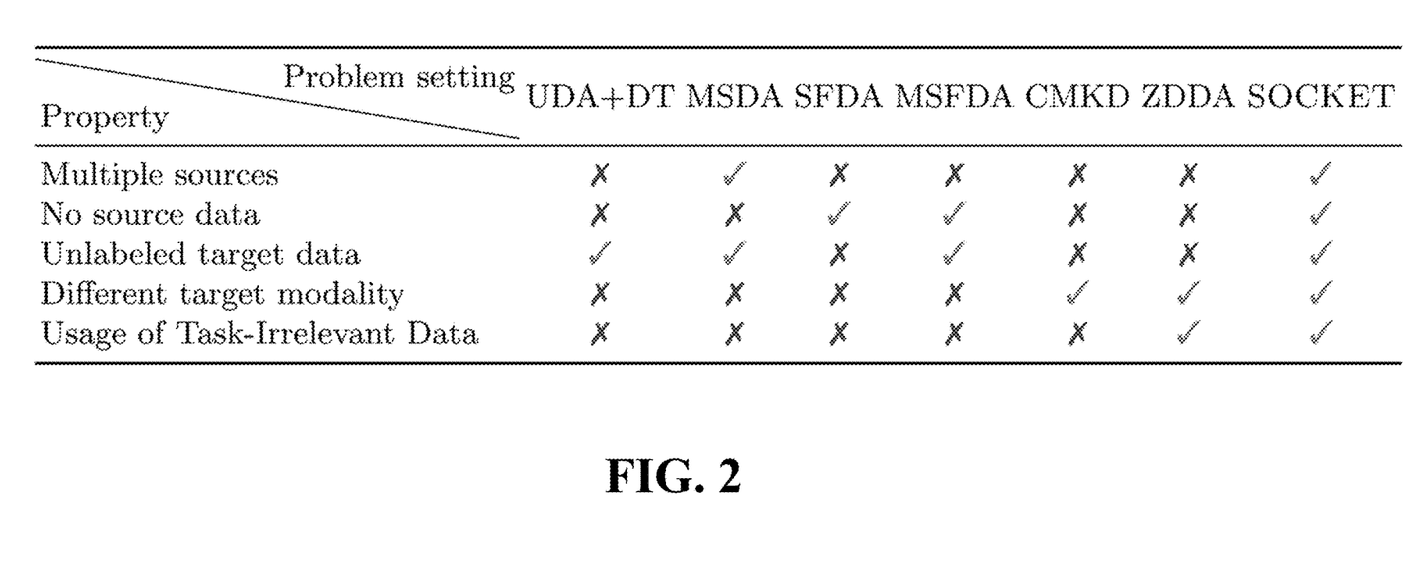
FIG. 2 shows differences between the problem settings used in prior art and SOCKET.

FIG. 2 shows the related work and compares them with SOCKET. In the figure, we compare our work with existing problem settings in literature for knowledge transfer across different domains and modalities. The competitive settings described in this figure are: (1) UDA (Unsupervised Domain Adaptation), DT (Domain Translation), (2) MSDA (Multi-source domain adaptation), (3) SFDA (Source free single source DA), (4) MSFDA (Source free multi-source DA), (5) CMKD (Cross modal knowledge distillation), and (6) ZDDA (Zero shot DA), respectively. It should be noted that only the system according to the present invention allows cross-modal knowledge transfer from multiple sources without any access to relevant source training data for an unlabeled target dataset of a different modality.

Figure 3:
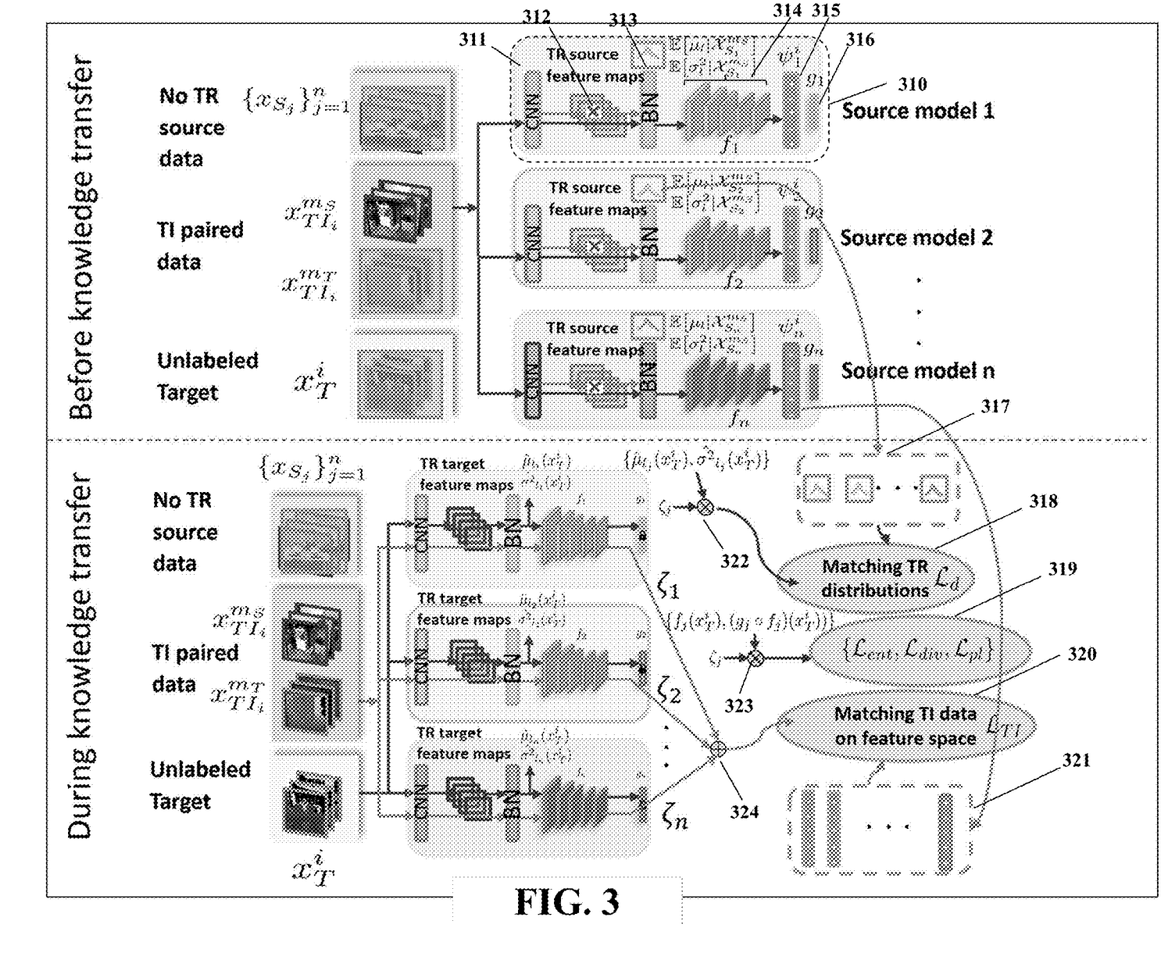
FIG. 3 shows detailed SOCKET procedure, according to embodiments of the present invention.
Figure 13:
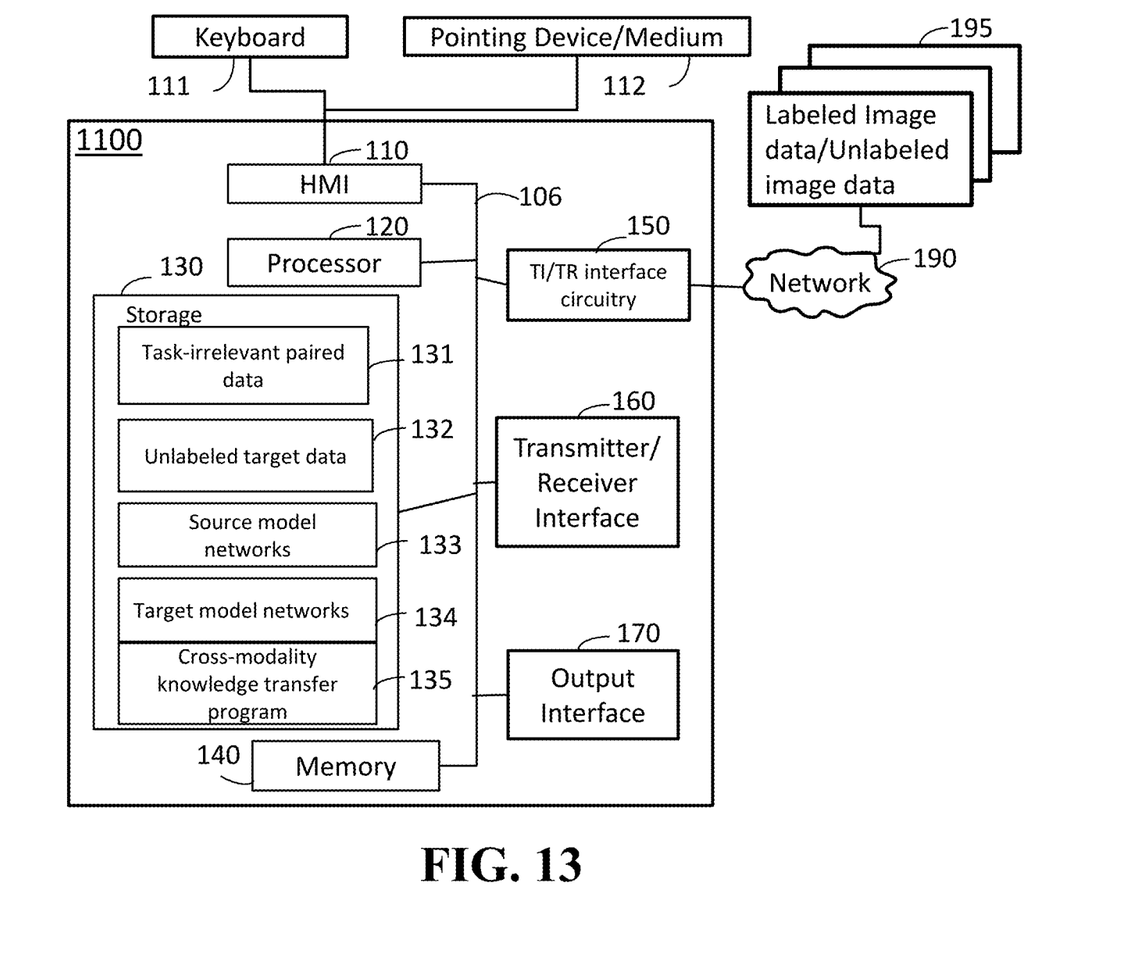
FIG. 13 shows a cross-modality knowledge transfer system according to some embodiments of the present invention.

FIG. 3 shows source models 1-n (program modules 1-n) formed by one or more neural networks based on a cross-modality knowledge transfer system 1100 (illustrated in FIG. 13). For instance, a source model 310 includes convolutional neural network layers (CNN layers) 311 which outputs intermediate feature maps 312, batch normalization (BN) layers 313 in the feature encoder 314, and classification layers (classifiers). The output of the feature encoder 315 is sent to a fully-connected classifier layer 316. In some cases, the source models (corresponding to a source modality) can be referred to as source model networks. Our framework can be split into two parts: (i) Before Knowledge Transfer (upper side): The cross-modality knowledge transfer system activates the BN layers and the source feature encoders of the source models but freeze the other parts of the source models including the CNNs and the classifiers, and pass the task-irrelevant (TI) source data through the activated BN layers and source feature encoders to extract the TI source features and source moments. The term "freeze" means that the parameters in the frozen layers are kept fixed and not updated. As task-relevant (TR) source feature maps are not available, the cross-modality knowledge transfer system extracts the stored moments of its distribution from the BN layers. (ii) During Knowledge Transfer (lower side): The cross-modality knowledge transfer system freezes only the classification layers (classifiers) and feed the TI and unlabeled TR target data through the target models (corresponding to a target modality) to get batch-wise TI target features 324 and the TR target moments 322, respectively both combined from all the models using mixing weights, $\zeta_k$'s. In some cases, the target models can be referred to as target model networks.

The cross-modality knowledge transfer system matches (combines) them respectively with the pre-extracted source features 321 using the TI feature matching loss 320, and source moments 317 using the distribution matching loss 318. Both the TI feature matching loss and the distribution matching loss are modality-specific losses. The TR target features 323 are used to compute the modality-agnostic losses (modality-agnostic loss functions) 319. The combination of modality-specific and modality-agnostic loss functions are minimized to jointly train all the feature encoder parameters along with the mixing weights, $\xi_k$'s. The final target model is the optimal linear combination of the updated source models (corresponding to the trained target model networks).

Depth sensors like Kinect and RealSense, LIDAR for measuring point clouds directly, or high resolution infra-red sensors such as from FLIR, allow for expanding the range of applications of computer vision compared to using only visible wavelengths. Sensing depth directly can provide an approximate three-dimensional picture of the scene and thus improve the performance of applications like autonomous navigation, while sensing in the infra-red wavelengths can allow for easier pedestrian detection or better object detection in adverse atmospheric conditions like rain, fog, and smoke. These are just a few examples.

Building computer vision applications using the now-straightforward supervised deep learning approach for modalities like depth and infrared needs large amounts of diverse labeled data. However, such large and diverse datasets do not exist for these modalities and the cost of building such datasets can be prohibitively high. In such cases, researchers have developed methods like knowledge distillation to transfer the knowledge from a model trained on a modality like RGB, where large amounts of labeled data are available, to the modality of interest like depth.

In contrast to prior work, we tackle a novel and challenging problem in the context of cross-modal knowledge transfer. We assume that we have access only to (a) the source models trained for the task of interest (TOI), and (b) unlabeled data in the target modality where we need to construct a model for the same TOI. The key aspect is that the cross-modality knowledge transfer system requires no access to any data in the source modality for TOI. Such a problem setup is important in cases where memory and privacy considerations do not allow for sharing the training data from the source modality; only the trained models can be shared.

Some embodiments provide SOCKET: SOurce-free Cross-modal KnowledgE Transfer as an effective solution to this problem for bridging the gap between the source and target modalities. To this end, (1) we show that employing an external dataset of source-target modality pairs, which are not relevant to TOI—which we call Task-Irrelevant (TI) data—can help in learning an effective target model by bringing the features of the two modalities closer. In addition to using TI data, we encourage matching the statistics of the features of the unlabeled target data—which are Task-Relevant (TR) by definition—with the statistics of the source data which are available to us from the normalization layers that are present in the trained source model.

We provide important empirical evidence showing that the modality-shift from a source modality like RGB to a target modality like depth can be much more challenging than a domain shift from one RGB dataset to another. This shows that the proposed framework is necessary to help minimize the modality gap, so as to make the knowledge transfer more effective. Based on the above ideas, we show that we can improve on existing state-of-the-art methods which were devised only for cross-domain setting in the same modality. We summarize the main features of the present disclosure below:

1. We formulate a novel problem for knowledge transfer from a model trained for a source modality to a different target modality without any access to task-relevant source data and when the target data is unlabeled.
2. In order to bridge the gap between modalities, we propose a novel framework, SOCKET, for cross-modal knowledge transfer without access to source data (a) using an external task-irrelevant paired dataset, and (b) by matching the moments obtained from the normalization layers in the source models with the moments computed on the unlabeled target data.
3. Extensive experiments on multiple datasets—both for knowledge transfer from RGB to depth, and from RGB to IR, and both for single-source and multi-source cases—show that SOCKET is useful in reducing the modality gap in the feature space and produces significantly better performance (improvement of as high as 12% for some cases) over the existing source-free domain adaptation baselines which do not account for the modality difference between the source and target modalities.
4. We also show empirically that, for the datasets of interest, the problem of knowledge transfer between modalities like RGB and depth is harder than just domain shifts in the same modality such as sensor changes and viewpoint shifts.

Problem Setup and Notation

We address the problem of source-data free cross-modality knowledge transfer by devising specialized loss functions that help reduce the gap between source and target modality features. We focus on the task of classification where both the source and target data belong to the same N classes. Let us consider that we have n source models of the same modality (e.g., RGB). We denote the trained source classifiers as $\{\mathcal{F}_{S_k}^{m_S}\}_{k=1}^n$, where $S_k$ denotes the k-th source model and $m_S$ represents the modality on which the source models were trained. The source models are denoted as $\mathcal{F}_{S_k}^{m_S}$ which are trained models that map images from the source modality distribution $X_{S_k}^{m_S}$ to probability distribution over the classes. $\{x_{S_k}^i, y_{S_k}^i\}_{i=1}^{n_k} \sim X_{S_k}^{m_S}$ are the data on which the k-th source model was trained, $n_k$ being the number of training data points corresponding to the k-th source. In our problem setting, at the time of knowledge transfer to the target modality, the source data are unavailable for all the sources.

We also have access to an unlabeled dataset in the target modality $\{x_T^i\}_{i=1}^{n_T} \sim X_T^{m_T}$, where $n_T$ is the number of target samples. Note that the target modality, $m_T$, is different from the source modality. Traditional source free UDA methods try to mitigate domain shift by adapting the source models to unlabeled target data that belong to the same modality. As we will show, applying these methods directly to the cross-modal setting results in poor performance. Hence, we propose to solve this problem using two novel losses as regularization terms which minimize the modality gap between source and target modalities. Our goal is to learn a target classifier $\mathcal{F}_T^{m_T}$, that adapts well on a target distribution obtained from a different sensor modality (e.g., depth or NIR).

To train $\mathcal{F}_T^{m_T}$, we employ (a) methods that enable learning feature embeddings for the target modality that closely match with the source modality embeddings, which we group under modality-specific losses (modality-specific loss functions), since it bridges the gap between two different modalities; (b) modality-agnostic loss terms which operate only on the unlabeled target data and do not take into account shift in modality.

We split each of the source models into two blocks—feature encoder and classifier. For the k-th source model, we denote these blocks as $f_k$ and $g_k$, respectively. The function $f_k: \mathbb{R}^{H \times W} \to \mathbb{R}^\eta$ maps the input image to an $\eta$ dimensional feature vector and $g_k: \mathbb{R}^\eta \to \mathbb{R}^N$ maps those features to the probability distributions over the N classes, the maximum of which is treated as the classifier prediction. We can thus write $\mathcal{F}_{S_k}^{m_S} = g_k \circ f_k$, where "$\circ$" is function composition. Since the classifier layer $g_k$ contains the information about unseen k-th source domain distribution, we freeze all the $g_k$'s and train the target-specific feature encoders by optimizing over all $f_k$'s.

Cross-Modal Feature Alignment

Traditional source free UDA methods use domain specific but modality-agnostic losses which do not help in reducing the feature distance between the source and target modalities. To better capture the cross-modal relationship between source and target, we propose the framework SOCKET to reduce the modality gap. In order to train the target model, $\mathcal{F}_T^{m_T}$, with reduced modality-gap, we propose using task-irrelevant feature matching and task-relevant distribution matching which are described next.

Task-Irrelevant Feature Matching

Capturing the mapping between two distinct modalities effectively requires lots of paired data from both modalities. For our task of interest, we do not have the task relevant (TR) dataset, which includes data relevant for the task of interest (TOI), on the source side. As a result, it is not possible to match the target modality with the source modality by using the data from task relevant classes directly. In this scenario, we propose to use Task-Irrelevant (TI) paired data from both modalities to reduce modality gap. TI data refers to a dataset that contains samples belonging to only classes that are completely disjoint from the TR classes and can be from any external dataset. For modalities like RGB-depth and RGB-IR, we can access a large amount of paired TI data, which are available in public datasets. We denote the paired TI data as $\{x_{TI_i}^{m_S}, x_{TI_i}^{m_T}\}_{i=1}^{n_{TI}}$ where $x_{TI_i}^{m_S}$ is the i-th TI data point from source modality and $x_{TI_i}^{m_T}$ is its paired counterpart from the target modality, $n_{TI}$ the total number of pairs. We compute our proposed loss $\mathcal{L}_{TI}$ using TI data as follows:

Step 1: The cross-modality knowledge transfer system feeds source modality images of the TI dataset through each of the source models to pre-compute features that are good representations of modality $m_S$. We denote the i-th TI source feature extracted from source j as $\psi_j^i$:

$$\psi_j^i = f_j(x_{TI_i}^{m_S}) \quad (1)$$

Step 2: During the knowledge transfer phase, the cross-modality knowledge transfer system feeds the target modality images of the TI dataset which are encouraged to match the corresponding pre-extracted source modality features. The cross-modality knowledge transfer system is configured to do so by minimizing $\mathcal{L}_{TI}$ defined below with respect to the parameters in the feature encoders for the target modality:

$$\mathcal{L}_{TI} = \frac{1}{n_{TI}} \sum_{i=1}^{n_{TI}} \left\| \sum_{j=1}^{n} \zeta_j \psi_j^i - \sum_{j=1}^{n} \zeta_j f_j(x_{TI_i}^{m_T}) \right\| \quad (2)$$

Task-Relevant Distribution Matching

In the task-irrelevant feature matching, we match the TI features of two modalities in the feature space. Even if this captures some class independent cross modal mapping between source and target modalities, it has no information about the TR-class conditional cross modal mapping. By this term we refer to the cross modal relationship between source and target, given the relevant classes. Assuming that the marginal distribution of the source features across the batches can be modeled as Gaussian, such feature statistics can be fully characterized by its mean and variance. We propose to match the feature statistics across the source and target, to reduce the modality gap further.

It might seem as though some amount of source data would be required to estimate the batch-wise mean and variance of its feature map, but the running average statistics stored in the conventional BatchNorm (BN) layers are good enough to serve our purpose. The BN layers normalize the feature maps during the course of training to mitigate the covariate shifts. As a result it is able to capture the channel-wise feature statistics cumulatively over all the batches, which gives rise to a rough estimate of the expected mean and variance of the batch-wise feature map, at the end of training. Let us consider that the BN layer corresponding to the l-th convolution layer ($\mathcal{B}_l$) has $r_l$ nodes and there exist b number of such layers per source model. Then we refer to the expected batch-wise mean and variance of the l-th convolution layer of the k-th source model as $\mathbb{E}[\mu_l | X_{S_k}^{m_S}] \in \mathbb{R}^{r_l}$ and $\mathbb{E}[\sigma_l^2 | X_{S_k}^{m_S}] \in \mathbb{R}^{r_l}$.

Prior to the start of the knowledge transfer phase, we pre-extract the information about the source feature statistics from all of the pre-trained source models. During the knowledge transfer phase, for each iteration we calculate the batch-wise mean and variance of the feature map of target data from all the source models, linearly combine them according to the weights $\zeta_i$ and minimize the distance of this weighted combination with the weighted combination of the pre-computed source feature statistics. We calculate this loss $\mathcal{L}_d$ given by:

$$\mathcal{L}_d = \Sigma_{l=1}^b (\|\Sigma_{j=1}^n \zeta_j \mathbb{E}[\mu_l | X_{S_j}^{m_S}] - \Sigma_{j=1}^n \zeta_j \hat{\mu}_{l_j}\| + \|\Sigma_{j=1}^n \zeta_j \mathbb{E}[\sigma_l^2 | X_{S_j}^{m_S}] - \Sigma_{j=1}^n \zeta_j \hat{\sigma}_{l_j}^2\|) \quad (3)$$

where $\mathbb{E}[\mu_l | X_{S_j}^{m_S}]$ and $\mathbb{E}[\sigma_l^2 | X_{S_j}^{m_S}]$ are the running mean and variance of the batchnorm layer corresponding to the l-th convolution layer of source j, which we refer as $\mathcal{B}_l^j$, and $$\hat{\mu}_{l_j} = \frac{1}{n_T} \sum_{k=1}^{n_T} \mathcal{B}_l^j(x_T^k) \text{ and } \hat{\sigma}_{l_j}^2 = \frac{1}{n_T} \sum_{k=1}^{n_T} \left(\mathcal{B}_l^j(x_T^k) - \hat{\mu}_{l_j}\right)^2$$

denote the mean and variance of the target output from the same batchnorm layer, during knowledge transfer phase. The losses $\mathcal{L}_{TI}$ and $\mathcal{L}_d$ minimize the modality gap between source and target. We name the combination of these two losses as Modality Specific Loss $\mathcal{L}_{ms} = \lambda_{TI} \mathcal{L}_{TI} + \lambda_d \mathcal{L}_d$, where $\lambda_{TI}$ and $\lambda_d$ are regularization hyper-parameters.

Overall Optimization

The two proposed methods above help to reduce the modality gap between source and target without accessing task-relevant source data. In addition to them, we employ the unlabeled target data directly for knowledge transfer. Specifically, we perform information maximization along with minimization of a self-supervised pseudo-label loss.

Information Maximization (IM): IM is essentially the task of performing maximization of the mutual information between distribution of the target data and its labels predicted by the source models. This mutual information is a combination of a conditional and a marginal entropy of the target label distribution.

Further, we calculate the conditional entropy $\mathcal{L}_{ent}$ and the marginal entropy termed as diversity $\mathcal{L}_{div}$ as follows:

$$\mathcal{L}_{ent} = -\frac{1}{n_T}\left[\sum_{i=1}^{n_T}\left(\mathcal{F}_T^{m_T}(x_T^i)\right)\log\left(\mathcal{F}_T^{m_T}(x_T^i)\right)\right], \quad (4)$$

$$\mathcal{L}_{div} = -\sum_{j=1}^{N}\bar{p}_j\log\bar{p}_j,$$

where $\mathcal{F}_T^{M_T}(x_T^i) = \sum_{k=1}^{n} \zeta_k \mathcal{F}_{S_k}^{m_S}(x_T^i)$, $\zeta_k$ is the weight assigned to the k-th source such that $\zeta_k \geq 0$, $\sum_{k=1}^{n} \zeta_k = 1$ and $$\bar{p} = \frac{1}{n_T}\sum_{i=1}^{n_T}\left[\mathcal{F}_T^{m_T}(x_T^i)\right] \in \mathbb{R}^N$$

is the empirical label distribution. The mutual information is calculated as $\mathcal{L}_{IM} = \mathcal{L}_{div} - \mathcal{L}_{ent}$. Maximization of $\mathcal{L}_{IM}$ (or minimization of $-\mathcal{L}_{IM}$) ensures the target labels, as predicted by the sources, more confident and diverse in nature.

Pseudo-label loss: Maximizing $\mathcal{L}_{IM}$ helps to obtain labels that are more confident in prediction and globally diverse. However, that does not prevent mislabeling (i.e., assigning wrong labels to the inputs), which leads to confirmation bias. To alleviate this problem, we adopt a self supervised pseudo-label based cross entropy loss. After calculating pseudo-labels we compute the pseudo-label cross entropy loss $\mathcal{L}_{pl}$ as follows:

$$\mathcal{L}_{pl} = -\frac{1}{n_T}\sum_{i=1}^{n_T}\sum_{k=1}^{K} 1\{\hat{y}_T^i = k\}\log\left[\mathcal{F}_T^{m_T}(x_T^i)\right]_k \quad (5)$$

where, $\hat{y}_T^i$ is the pseudo-label for the i-th target data point and $1\{\bullet\}$ is an indicator function that gives value 1 when the argument is true. Our final loss is the combination of the above two losses. We call this combination modality agnostic loss $\mathcal{L}_{ma}$, which is expressed as $\mathcal{L}_{ma} = -\mathcal{L}_{IM} + \lambda_{pl}\mathcal{L}_{pl}$.

Figure 4:
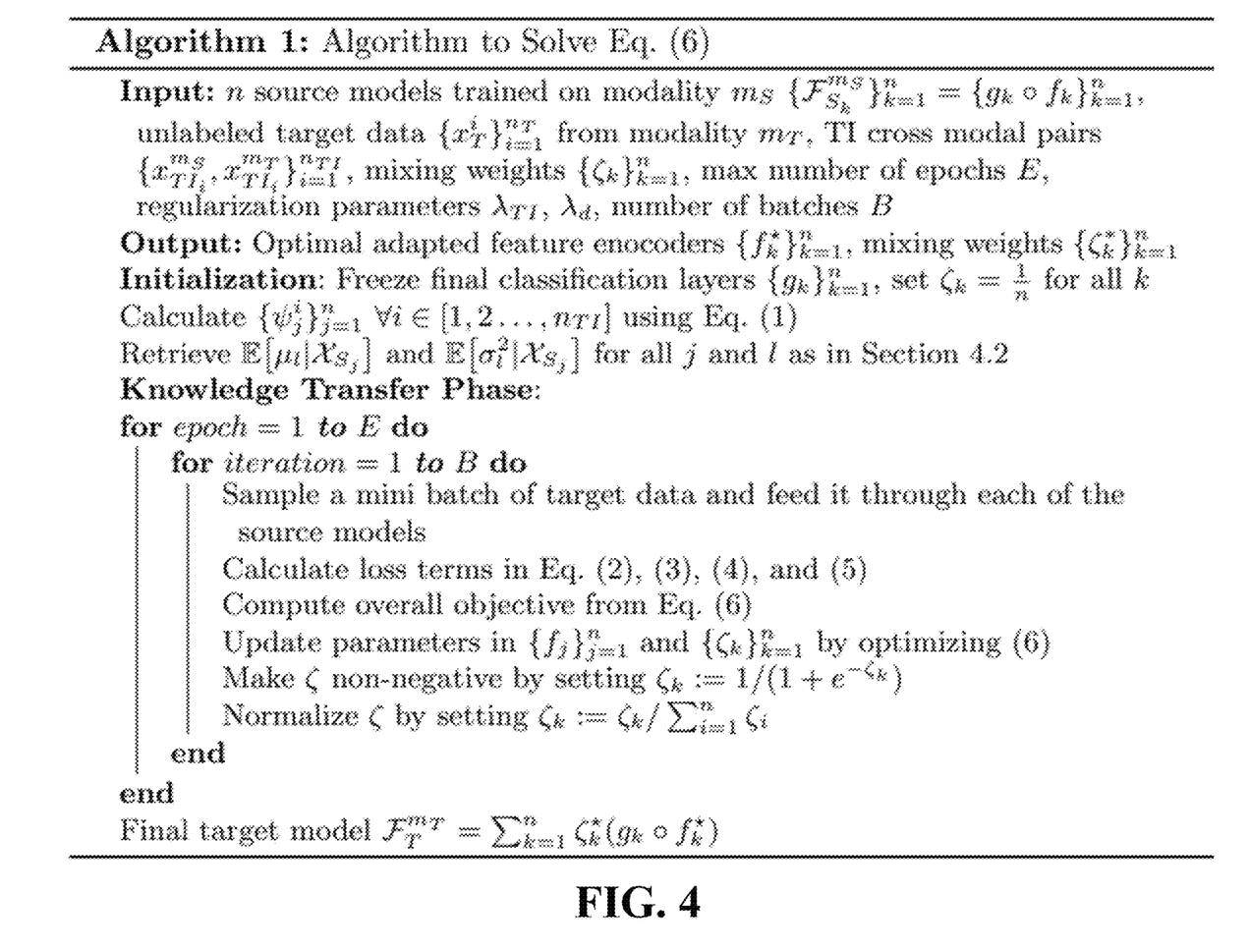
FIG. 4 shows the full description of the SOCKET method in the form of an algorithm, according to embodiments of the present invention.

We calculate the overall objective function as the sum of modality agnostic and modality specific losses and optimize the weights in the feature encoders by minimizing the following objective function, also called the loss function, using the algorithm shown in FIG. 4. The figure shows the full description of the SOCKET method in the form of the algorithm, according to embodiments of the present invention.

$$\mathcal{L}_{ma} + \mathcal{L}_{ms} \; st \sum_{k=1}^{n} \zeta_k = 1, \zeta_k \geq 0 \quad (6)$$

Experiments

We first describe the datasets, baselines and experimental details we employ. Next, we show results of single and multi-source cross modal transfer which show the efficacy of our method. We also demonstrate experimentally that source free cross modal is a much harder problem compared to cross domain knowledge transfer. We conclude the experiments by performing analysis on different hyperparameters.

Datasets, Baselines and Experimental Details

Figure 5:
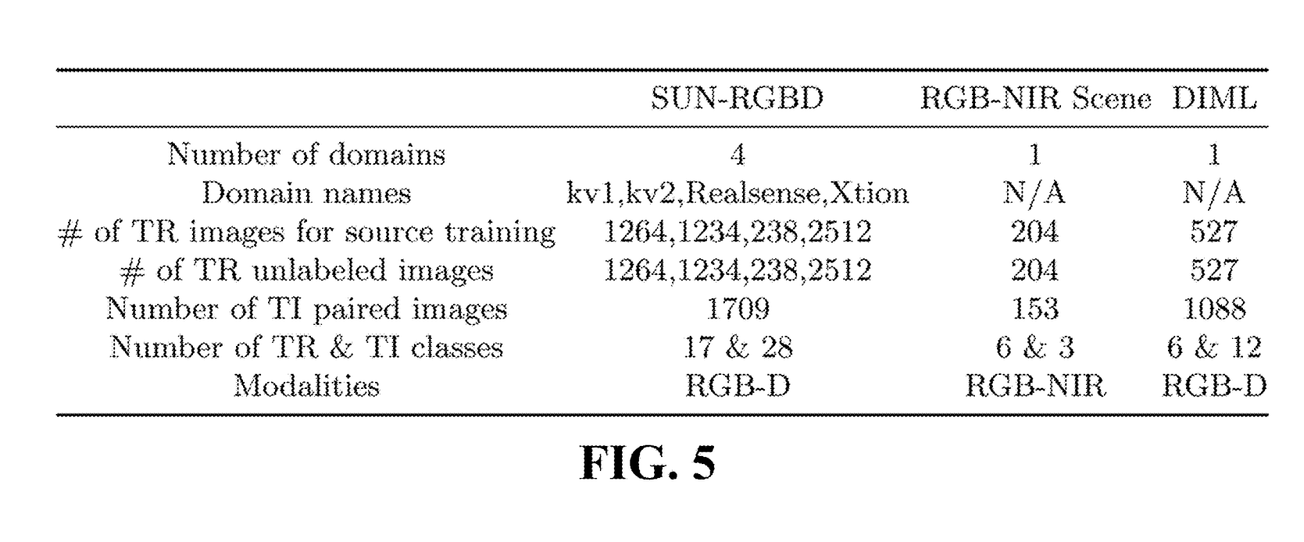
FIG. 5 shows the main features of the datasets used in the experiments, according to embodiments of the present invention.

Datasets: To show the efficacy of our method we extensively test on publicly available cross-modal datasets. We show results on two RGB–D (RGB and Depth) datasets—SUN RGB–D and DIML RGB+D, and the RGB–NIR Scene (RGB and Near Infrared) dataset. FIG. 5 shows the main features of the datasets used in the experiments, according to embodiments of the present invention, summarizing the statistics of the datasets.

SUN RGB–D: A scene understanding benchmark dataset which contains 10335 RGB–D image pairs of indoor scenes. The dataset has images acquired from four different sensors named Kinect version1 (kv1), Kinect version2 (kv2), Intel RealSense and Asus Xtion. We treat these four sensors as four different domains. All of the images are distributed among 45 classes, out of which 17 classes are common across all the domains. We take those common classes as TR classes and the remaining 28 classes as TI classes. To train four source models, one for each domain, we use the RGB images from the TR classes, specific to that particular domain. We treat the TR depth images from each of the domains as the target modality dataset. Our goal here is to classify among the TR scene classes by adapting the RGB source models with the unlabeled target data, which are of depth modality.

DIML RGB+D: This publicly available dataset consists of more than 200 indoor/outdoor scenes. We use the smaller sample dataset instead of the full dataset, which has 1500/500 RGB–D pairs for training/testing distributed among 18 scene classes. We split the training pairs into RGB and depth, and treat those two as source and target, respectively. We further split those images into TR and TI images according to FIG. 5. The synchronized RGB–D frames have been captured using Kinect v2 and Zed stereo camera.

RGB–NIR Scene: This publicly available dataset consists of 477 images from 9 scene categories captured in RGB and Near-infrared (NIR). The images have been captured using separate exposures from modified SLR cameras, using visible and NIR. We perform single source knowledge transfer for this dataset by taking 6 of the categories as TR and the remaining 3 categories as TI. We did two experiments on this dataset: adaptation from RGB to NIR and vice versa.

Baseline Methods

The problem statement we focus on in this paper is new and has not been considered in literature before. As such, there is no direct baseline for our method. However, the closest related works are source free cross domain knowledge transfer methods that operates under both single and multi-source cases. SHOT and DECISION are the seminal and best-known works on single source and multi-source SFDA respectively and we compare against these two methods.

Unlike SOCKET, neither of these baselines employ strategies to overcome modality differences and use only the modality-agnostic loss $\mathcal{L}_{ma}$ for training the target models. Using scene classification as the task of interest, we will show that SOCKET outperforms these baselines for cross-modal knowledge transfer with no access to task-relevant source data.

Network Architecture

In our experiments, we take the well-known Resnet50 model pretrained on ImageNet as the backbone architecture for training the source models. Following the architectures, we replace the last fully connected (FC) layer with a bottleneck layer containing 256 units, within which we add a Batch Normalization (BN) layer at the end of the FC layer. A task specific FC layer with weight normalization is added at the end of the bottleneck layer.

Performing Knowledge Transfer

Recall that we initialize the target models with the source weights and the classifier layers are frozen. The weights in the feature encoders and source mixing weight parameters ($\zeta_k$'s) in the case of multi-source are the optimization parameters. $\lambda_{pi}$ is set as 0.3 for all the experiments following. For the regularization parameters $\lambda_{TI}$ and $\lambda_d$ of modality specific losses, we set them to be equal. We empirically choose those parameters in such a way so as to balance it with the modality agnostic losses such that no loss component overpowers the other by a large margin. Empirically we found that a range of (0.1,0.5) works best. All of the values in this range outperform the baselines and we report the best accuracies amongst those. For images from the modalities other than RGB, which are depth and NIR, we repeat the single-channel images into three-channel images, to be able to feed it through the feature encoders which are initialized from the source models trained on RGB images. We use a batch size of 32 for all of our experiments. We run our method 3 times for all experiments with 3 random seeds in PyTorch and report the average accuracies over those.

Results on the SUN RGB-D Dataset

Figure 6:
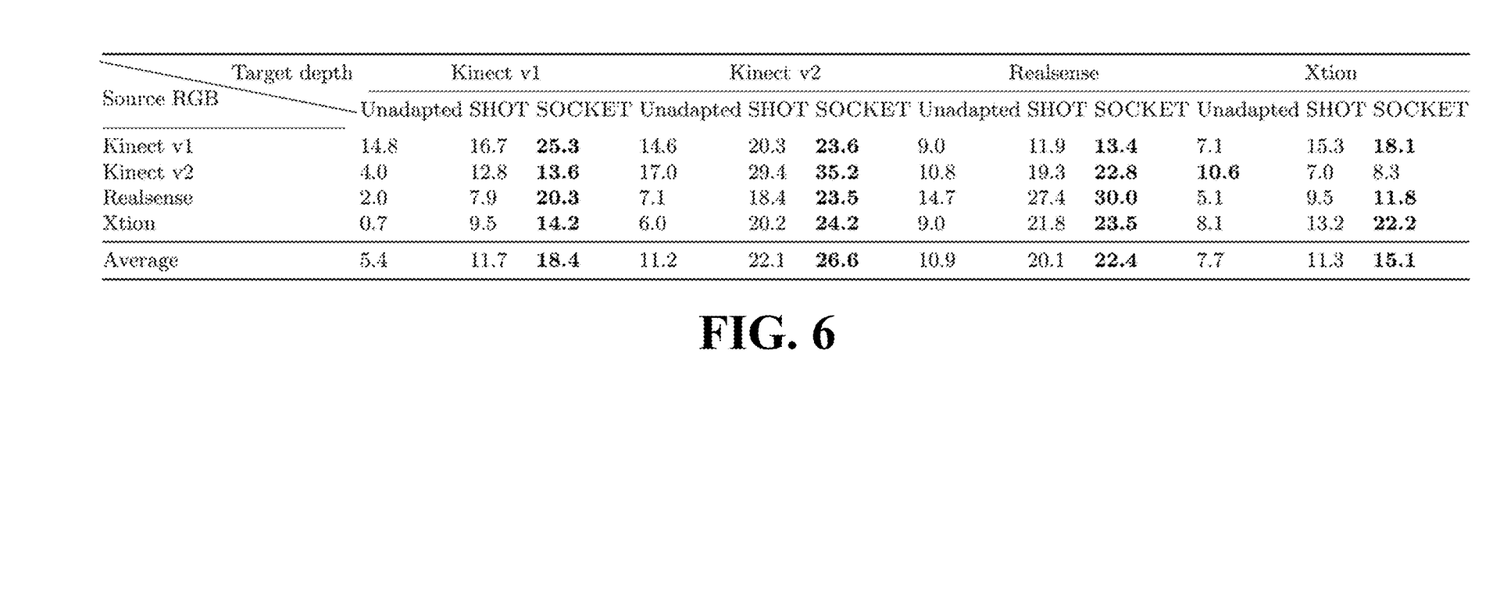
FIG. 6 shows the results on the SUN RGB–D dataset for the task of single-source cross-modal knowledge transfer from RGB to depth modality without access to task relevant source data for all pairs of domains, according to embodiments of the present invention.

Our method is general enough to deal with any number of sources and we demonstrate both single and multi-source knowledge transfer. FIG. 6 shows the results on the SUN RGB-D dataset for the task of single-source cross-modal knowledge transfer from RGB to depth modality without access to task relevant source data for all pairs of domains, according to embodiments of the present invention. In the figure, we show single source RGB to depth results for all of the four domains. Treating the unlabeled depth data of each domain as target, we adapt these using source models trained on RGB data from each of the four domains. The rows represent RGB domains on which the source models are trained. The columns represent the knowledge transfer results on the depth domains for three methods: "Unadapted" shows results with unadapted source, SHOT and SOCKET. It is easily evident from FIG. 6, that for the target domains Kinect V1, Kinect V2, Realsense and Xtion, SOCKET consistently outperforms the baseline by a good margin of 6.7%, 4.5%, 2.3%, and 3.8%, respectively, thus proving the efficacy of SOCKET in a source-free cross modal setting. In some of the cases SOCKET outperforms the baseline by a very large margin, as high as 12.4% (Realsense-RGB to Kinect V1-depth) or 9.0% (Xtion-RGB to Xtion-depth).

Figure 7:
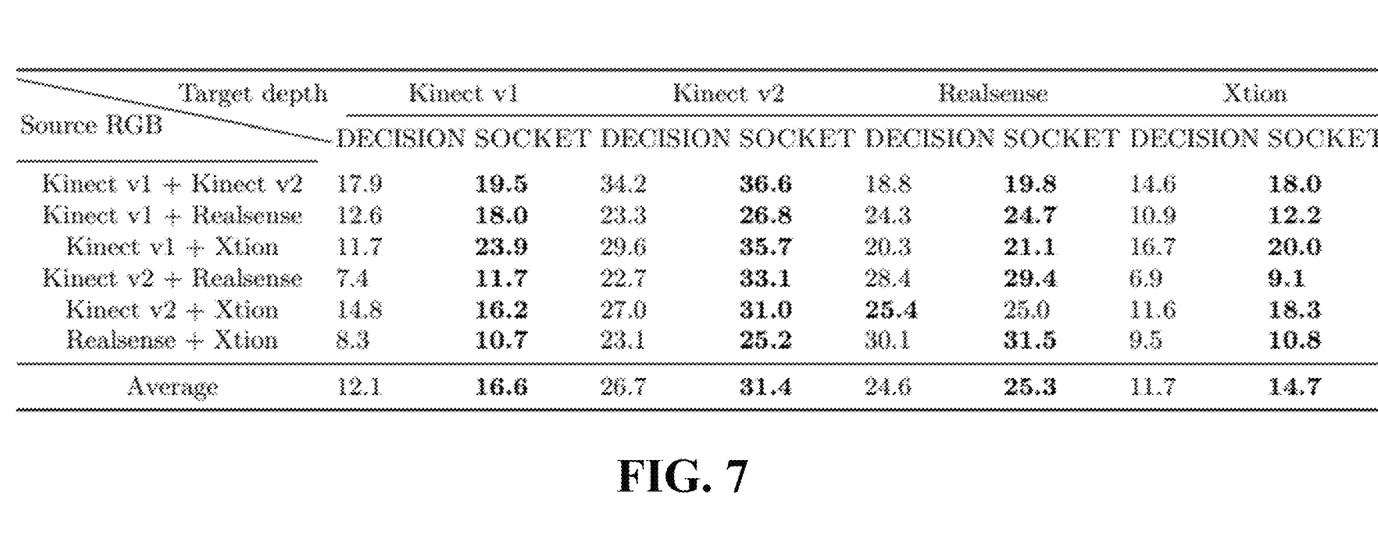
FIG. 7 shows the results on the SUN RGB–D dataset for the task of multi-source cross-modal knowledge transfer from RGB to depth modality without access to task relevant source data, according to embodiments of the present invention.

FIG. 7 shows the results on the SUN RGB-D dataset for the task of multi-source cross-modal knowledge transfer from RGB to depth modality without access to task relevant source data according to embodiments of the present invention.

In this case, the figure shows two-source RGB to depth adaptation results. For four domains we get six two-source combinations, each of which is used for adaptation to depth data from all four domains. The columns represent the knowledge transfer results on the domain specific depth data for DECISION and SOCKET. We see that in this case also, on average SOCKET outperforms the baseline for all four target domains by good margins. Following the trend in single source adaptation, SOCKET shows some very good improvement for some individual cases like (Kinect v1+Xtion)-RGB to Kinect v1 depth-improvement of 12.2%—and (Kinect v2+Realsense)-RGB to Kinect v2 depth-improvement of 10.4%.

Results on the DIML RGB+D Dataset

Figure 8:
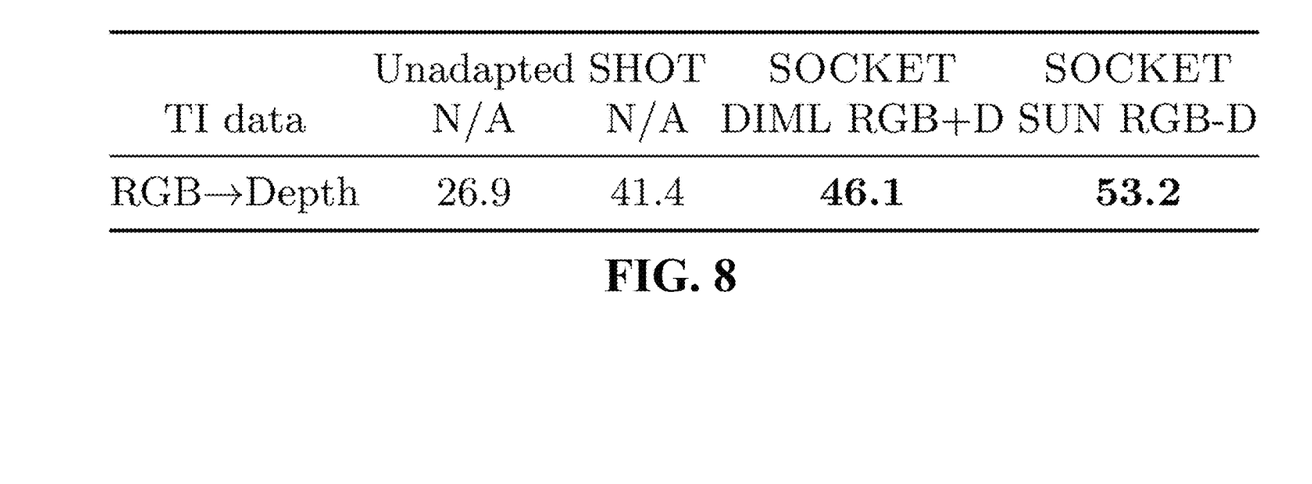
FIG. 8 shows the results on the DIML dataset when different task-irrelevant datasets are used SOCKET, in comparison to the unadapted source and SHOT, according to embodiments of the present invention.

For this dataset we did a single source adaptation experiment by restructuring the dataset according to FIG. 5. FIG. 8 shows the results on the DIML dataset when different task-irrelevant datasets are used SOCKET, in comparison to the unadapted source and SHOT, according to some embodiments of the present invention. In FIG. 8, we use the TI data from both the DIML RGB+D as well as SUN RGB-D datasets in two separate columns, where the TI data of SUN RGB+D is the same that have been used for experiments related to the SUN RGB-D dataset. By doing so, we show that SOCKET can perform well even with TI data from a completely different dataset, and find that SOCKET has a relative gain of 4.7% and 11.8% over baseline for these two TI data settings, respectively.

Results on the RGB-NIR Scene Dataset

Figure 9:
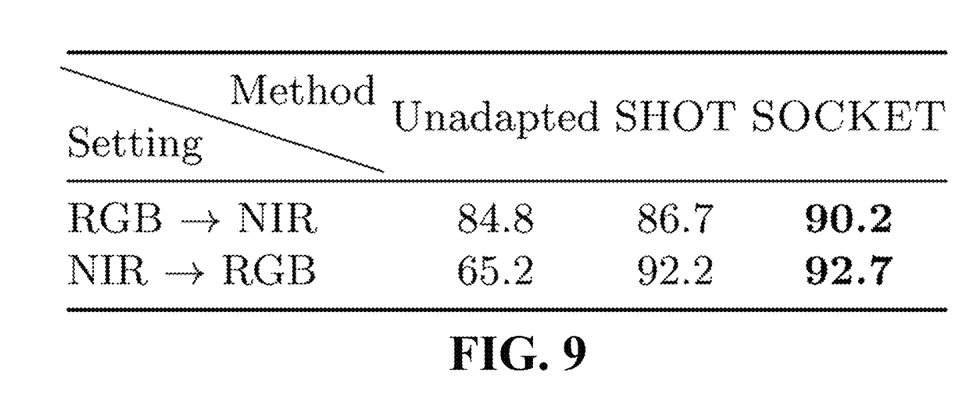
FIG. 9 shows the results on RGB–NIR dataset for the task of single-source cross-modal knowledge transfer from RGB to NIR and vice versa without task-relevant source data, according to embodiments of the present invention.

We now show that SOCKET also outperforms baselines when the modalities are RGB and NIR using the RGB-NIR dataset. We follow the splits described in FIG. 5. We do experiments on both RGB to NIR and vice versa. FIG. 9 shows the results on RGB-NIR dataset for the task of single-source cross-modal knowledge transfer from RGB to NIR and vice versa without task-relevant source data according to some embodiments of the present invention. The columns represent the knowledge transfer results on the depth domains for three methods: "Unadapted" shows results with unadapted source, SHOT and SOCKET. For RGB to NIR transfer, SOCKET shows 3.5% improvement, while for NIR to RGB transfer, it shows 0.5% improvement over the competing method.

Cross Modal Vs Cross Domain

Figure 10:
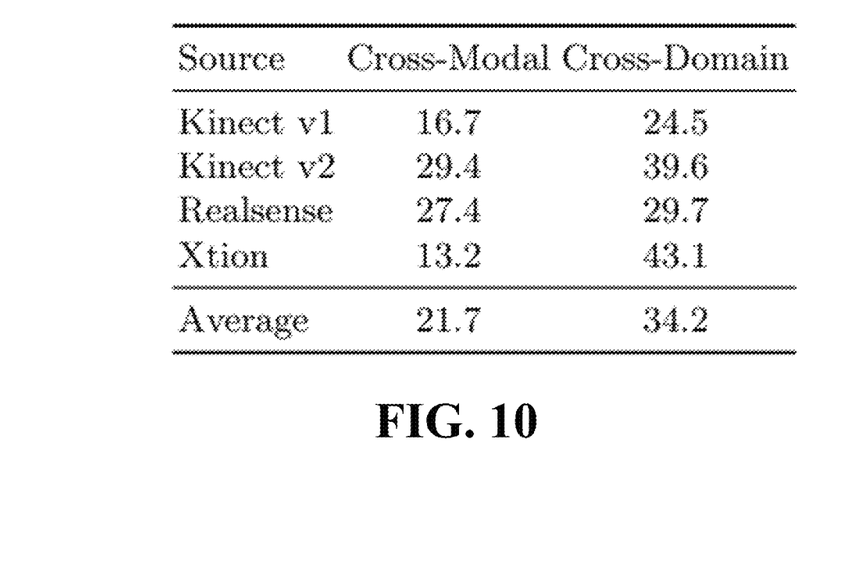
FIG. 10 shows the difference in results of cross modal and cross domain knowledge transfer for SUN RGB–D scene classification using SHOT, according to embodiments of the present invention.

In order to show the importance of the novel problem we consider, we compare the single-source knowledge transfer results on the SUN RGB-D dataset for modality change vs domain shift. FIG. 10 shows the difference in results of cross modal and cross domain knowledge transfer for SUN RGB-D scene classification using SHOT according to some embodiments of the present invention. We use SHOT which is a source-free UDA method for this experiment. All the domain-specific source models are trained on RGB images. For domain shift, the targets are all the RGB images of the remaining 3 domains and we report the average over them. Domain shift involves changes in sensor configuration, viewpoints, etc. For modality change, the target data are depth images from the same domain. The scenes are the same as in the RGB source, except they are captured using the depth sensor. The figure clearly shows that the accuracy drops by a large margin of 12.5% when we transfer knowledge across modalities instead of domains of the same modality. This shows that a cross-modal knowledge transfer is not the same as DA and a framework like SOCKET is necessary to reduce the modality gap for effective cross-modal knowledge transfer.

Ablation and Sensitivity Analysis

Contribution of Loss Components

Figure 11:
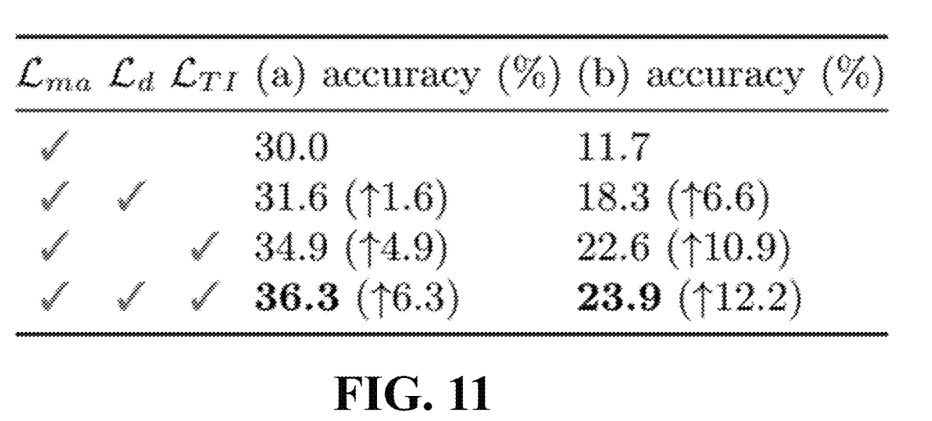
FIG. 11 shows the contribution of our proposed novel loss components to the results, according to embodiments of the present invention.

FIG. 11 shows the effect of our proposed novel losses on the accuracy according to some embodiments of the present invention. The first accuracy column (a) corresponds to single source adaptation from RGB to depth on Kinect V2 domain, whereas the second column (b) shows the multi-source RGB to depth adaptation result from Kinect V1+Xtion to Kinect V1 domain of SUN RGB-D dataset. The first row has the result with just the modality agnostic loss $\mathcal{L}_{ma}$, whereas second and third row shows the individual effect of our proposed modality specific losses along with the $\mathcal{L}_{ma}$. Both the cases SOCKET outperforms the baseline. The last row with both of our proposed losses in conjunction with $\mathcal{L}_{ma}$ yields the best result. We show the accuracy gain over using modality-agnostic loss ($\mathcal{L}_{ma}$) only inside the parentheses.

Effect of Number of TI Images

Figure 12A:
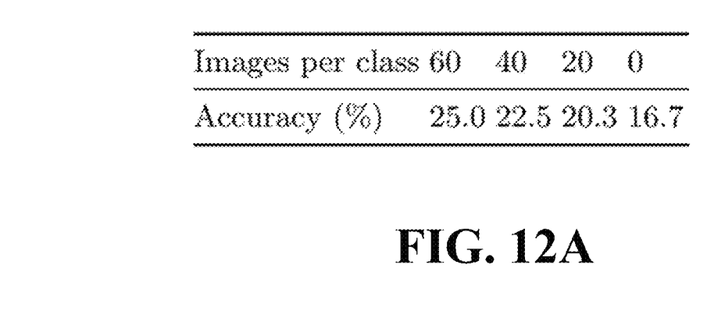
FIG. 12A shows the effect of number of TI data on SOCKET results, according to embodiments of the present invention.

FIG. 12A shows the effect of number of TI data on SOCKET results for the SUN RGB-D dataset according to some embodiments of the present invention. We perform knowledge transfer from Kinect v1 RGB to unlabeled depth data. We use six random TI classes and vary the number of TI images per class from 0 to 60 in steps of 20. The figure clearly shows that increasing per class samples of TI data results in improving the scene-classification accuracy for RGB to depth transfer on the SUN RGB–D dataset. In short, for a fixed number of TI classes, the more TI images per class, the better SOCKET performs.

Effect of Regularization Parameters

Figure 12B:
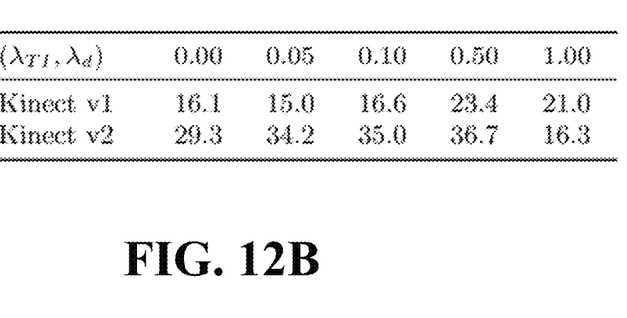
FIG. 12B shows the effect of regularization hyper-parameters on SOCKET results, according to embodiments of the present invention.

FIG. 12B shows the effect of test accuracy vs the regularization hyper-parameters for our novel losses proposed as a part of SOCKET according to some embodiments of the present invention. We perform Kinect v1 and Kinect v2 RGB to Kinect v1 depth transfer for the SUN RGB–D dataset. We keep $\lambda_{TI}$ and $\lambda_d$ equal to each other for values between 0 to 1. Using the value of 0 is the same as using SHOT. From the figure, we see that as the value of the parameter increases the accuracy also increases up to a certain point, and then it starts decreasing.

We identify the novel and challenging problem of cross-modality knowledge transfer with no access to the task-relevant data from the source modality. For effective knowledge transfer to the target modality where we have only unlabeled data, some embodiments of the present invention can provide a framework, SOCKET, which includes devising loss functions that help bridge the gap between the two modalities in the feature space. The experimental results of both RGB-to-depth and RGB-to-NIR experiments show that SOCKET outperforms the baselines designed for source-free unsupervised domain adaptation which do not perform well under modality shift.

According to some embodiments of the present invention, the cross-modality knowledge transfer system and the computer-implemented cross-modality knowledge transfer method can reduce the memory sizes of the storage, solve the privacy issue regarding the source data, and reduce the training time period of the target model networks. Accordingly, the cross-modality knowledge transfer system and the computer-implemented cross-modality knowledge transfer method of the present invention can improve the function of a computer system (processor) and reduce the energy consumption of a computer system.

According to some features of the present invention, each source model network includes BN (Batch Normalization) layer and receives a set of unannotated/unlabeled datasets in the target modality that are to be classified. In some cases, the adapted target model (trained target networks) is used to perform a computer vision task on the target modality data.

For a set of "task-irrelevant" datasets, each datapoint is a pair of images with corresponding source and target modality images, is utilized to aid in the knowledge transfer procedure by reducing the source-target modality gap.

In the cross-modality knowledge transfer system, the statistics from one or more batch normalization layers are matched with the batch-wise statistics of the features of the unlabeled target modality data to aid in the knowledge transfer procedure by reducing the source-target modality gap.

Further, the adapted target model can be obtained by using the source model as the initialization and tuning the parameters of this model by minimizing one or more loss functions. In this case, the combination of loss functions may include entropy, pseudo-labeling and diversity which are defined on the neural network outputs given the target unlabeled data as inputs.

In some cases, the combination of loss functions may include feature distances between the source and target modality images from the task-irrelevant data which helps in the reducing the modality gap between the source and target features.

Further, the combination of loss functions may include the difference between statistics of features of the unlabeled target dataset and source feature statistics obtained from the batch normalization layers of the source model.

In some cases, the source-target modality pairs can be RGB-depth, RGB-infrared, RGB-LIDAR point clouds respectively or vice versa or other combinations of such modalities. The datasets can be in the form of images taken in a single snapshot or videos taken over longer durations. The task to be carried out on the target unlabeled datasets can be a computer vision task such as image recognition, object recognition and scene recognition.

FIG. 13 shows a cross-modality knowledge transfer system 1100 according to some embodiments of the present invention. The system 1100 may a neural network modules trained to provide a layout of a device. The cross-modality knowledge transfer system 1100 includes a TI/TR interface circuitry interface 150, at least one processor 120, a storage 130, a memory 140. The storage 130 and the memory 140 can be integrated on a circuitry and may be referred to as a memory. The storage 130 includes task-irrelevant paired datasets 131, unlabeled target datasets 132, source model networks (source models) 133, target model networks (target models) 134, and a cross-modality knowledge transfer program (a computer-implemented cross-modality knowledge transfer method) 135. The interface 150 is configured to communicate between the memory 140, the storage 130, the at least one processor 120. In some cases, the interface 150 can receive the task-irrelevant paired datasets 131, the unlabeled target datasets 132, the source model networks (source models) 133, the target model networks (target models) 134 from a database device (server) 195 outside the system 100 via a communication network 190 including a wireless communication network, wired network, internet, or combination thereof.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A cross-modality knowledge transfer system for adapting one or more source model networks to one or more target model networks, comprising:
    a memory configured to store task-irrelevant (TI) paired datasets, unlabeled task-relevant (TR) datasets, the one or more source model networks including batch normalization (BN) layers, feature encoders, convolutional neural network layers (CNN layers) and classifiers, the one or more target model networks including the BN layers, the feature encoders, the CNN layers and the classifiers, and a computer-implemented cross-modality knowledge transfer method having instructions;
    at least one processor configured to perform steps of the computer-implemented cross-modality knowledge transfer method according to the instructions, wherein the steps comprise:
    extracting TI source features from the one or more source model networks by passing the TI source paired datasets through the one or more source model networks, and extracting TR source moments from the BN layers of the one or more source model networks, wherein the CNN layers and the classifiers of the one or more source model networks are frozen;
    extracting batch-wise TI target features and TR target moments from one or more target model networks by passing the TI paired datasets and the unlabeled TR datasets through the one or more target model networks, wherein the classifiers of the one or more target model networks are frozen;
    computing modality-agnostic loss functions based on the extracted TR target features of the one or more target model networks;
    computing modality-specific loss functions by computing distances between the extracted TI target features and TR target moments between the TI source features and TI source moments respectively;
    training jointly the feature encoders of the one or more target model networks along with mixing weights by minimizing the computed modality-agnostic loss functions and modality-specific loss functions; and
    generating a final target model network by combining the trained one or more target model networks.

2. The cross-modality knowledge transfer system of claim 1, further comprising a TI/TR dataset interface configured to receive the TI paired datasets and the unlabeled TR datasets via a communication network, wherein the TI/TR dataset interface is configured to store the received TI paired datasets and unlabeled TR datasets into the memory.

3. The cross-modality knowledge transfer system of claim 1, wherein the at least one processor further performs transmitting model parameters of the generated final target model network to another untrained one or more target model networks via a network.

4. The cross-modality knowledge transfer system of claim 1, wherein pairs of the task-irrelevant (TI) datasets and the unlabeled task-relevant (TR) datasets are RGB images and depth images, RGB images and infrared images, or RGB images and LIDAR point clouds.

5. The cross-modality knowledge transfer system of claim 4, wherein the unlabeled task-relevant (TR) datasets are used for computer vision tasks including image recognition, object recognition and scene recognition.

6. The cross-modality knowledge transfer system of claim 1, wherein the TI source features are extracted from the feature encoders of the one or more source model networks, wherein the TR source moments are extracted from the BN layers of the one or more source model networks, wherein the batch-wise TI target features are extracted from the feature encoders of the one or more target model networks, wherein the TR target moments are extracted from the BN layers of the one or more target model networks.

7. The cross-modality knowledge transfer system of claim 1, wherein the batch-wise TI target features and the TR target moments extracted from the one or more target model networks are respectively combined using mixing weights.

8. The cross-modality knowledge transfer system of claim 1, wherein the modality-agnostic and modality-specific loss functions are used to bridge a gap between the one or more source model networks and the one or more target model networks in feature space.

9. The cross-modality knowledge transfer system of claim 8, wherein a combination of the modality-agnostic loss functions includes entropy, pseudo-labeling and diversity, wherein the entropy, pseudo-labeling and diversity are defined on outputs of the one or more source model networks.

10. The cross-modality knowledge transfer system of claim 8, wherein a combination of the modality-specific loss functions includes feature distances between the extracted TI source features and TI target features, and distances between the TI source moments and TR target moments.

11. A computer-implemented cross-modality knowledge transfer method having instructions using at least one processor and at least one memory, wherein the instructions comprising:
    extracting Task-irrelevant (TI) source features from the one or more source model networks by passing the TI source paired datasets through the one or more source model networks, and extracting Task-relevant (TR) source moments from the BN layers of the one or more source model networks, wherein the CNN layers and the classifiers of the one or more source model networks are frozen;
    extracting batch-wise TI target features and TR target moments from one or more target model networks by passing the TI paired datasets and the unlabeled TR datasets through the one or more target model networks, wherein the classifiers of the one or more target model networks are frozen;
    computing modality-agnostic loss functions based on the extracted TR target features of the one or more target model networks;
    computing modality-specific loss functions by computing distances between the extracted TI target features and TR target moments between the TI source features and TI source moments respectively;
    training jointly the feature encoders of the one or more target model networks along with mixing weights by minimizing the computed modality-agnostic and modality-specific loss functions; and
    generating a final target model network by combining the trained one or more target model networks.

12. The computer-implemented cross-modality knowledge transfer method of claim 11, further receiving, using a TI/TR dataset interface, the TI paired datasets and the unlabeled TR datasets via a communication network, wherein the TI/TR dataset interface is configured to store the received TI paired datasets and unlabeled TR datasets into the at least one memory.

13. The computer-implemented cross-modality knowledge transfer method of claim 11, wherein the at least one processor further performs transmitting model parameters of the generated final target model network to another untrained one or more target model networks via a network.

14. The computer-implemented cross-modality knowledge transfer method of claim 11, wherein pairs of the task-irrelevant (TI) datasets and the unlabeled task-relevant (TR) datasets are RGB images and depth images, RGB images and infrared images, or RGB images and LIDAR point clouds.

15. The computer-implemented cross-modality knowledge transfer method of claim 14, wherein the unlabeled task-relevant (TR) datasets are used for computer vision tasks including image recognition, object recognition and scene recognition.

16. The computer-implemented cross-modality knowledge transfer method of claim 11, wherein the TI source features are extracted from the feature encoders of the one or more source model networks, wherein the TR source moments are extracted from the BN layers of the one or more source model networks, wherein the batch-wise TI target features are extracted from the feature encoders of the one or more target model networks, wherein the TR target moments are extracted from the BN layers of the one or more target model networks.

17. The computer-implemented cross-modality knowledge transfer method of claim 11, wherein the batch-wise TI target features and the TR target moments extracted from the one or more target model networks are respectively combined using mixing weights.

18. The computer-implemented cross-modality knowledge transfer method of claim 11, wherein the modality-agnostic and modality-specific loss functions are used to bridge a gap between the one or more source model networks and the one or more target model networks in feature space.

19. The computer-implemented cross-modality knowledge transfer method of claim 18, wherein a combination of the modality-agnostic loss functions includes entropy, pseudo-labeling and diversity, wherein the entropy, pseudo-labeling and diversity are defined on outputs of the one or more source model networks.

20. The computer-implemented cross-modality knowledge transfer method of claim 18, wherein a combination of the modality-agnostic loss functions includes feature distances between the extracted TI source features and TI target features, and distances between the TI source moments and TR target moments.

* * * * *